(12) United States Patent
Himetani

(10) Patent No.: US 8,393,245 B2
(45) Date of Patent: Mar. 12, 2013

(54) VEHICLE OPERATION PEDAL

(75) Inventor: Yoshiro Himetani, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 128 days.

(21) Appl. No.: 12/906,445

(22) Filed: Oct. 18, 2010

(65) Prior Publication Data

US 2011/0094329 A1 Apr. 28, 2011

(30) Foreign Application Priority Data

Oct. 22, 2009 (JP) ................................ 2009-243847

(51) Int. Cl.
*G05G 1/30* (2008.04)
(52) U.S. Cl. .......................................... 74/512
(58) Field of Classification Search .................. 74/512, 74/513, 560
See application file for complete search history.

(56) References Cited

U.S. PATENT DOCUMENTS

| | | | | |
|---|---|---|---|---|
| 5,074,163 | A | * | 12/1991 | Baumann ........................ 74/512 |
| 6,070,492 | A | | 6/2000 | Beil |
| 6,397,468 | B2 | * | 6/2002 | Popowich .................... 29/897.2 |
| 6,513,407 | B1 | * | 2/2003 | Higgins ........................... 74/560 |
| 2002/0023516 | A1 | * | 2/2002 | Frobel et al. .................... 74/512 |
| 2010/0180717 | A1 | * | 7/2010 | Himetani ......................... 74/560 |
| 2010/0307284 | A1 | * | 12/2010 | Himetani et al. ................ 74/560 |
| 2011/0094330 | A1 | * | 4/2011 | Himetani et al. ................ 74/512 |

FOREIGN PATENT DOCUMENTS

| | | |
|---|---|---|
| EP | 0 314 108 A1 | 5/1989 |
| EP | 0 410 779 A2 | 1/1991 |
| EP | 0 899 646 A1 | 3/1999 |
| FR | 2 240 480 A1 | 3/1975 |
| JP | Y2-39-24920 | 8/1964 |
| JP | A-63-220310 | 9/1988 |
| JP | 02029812 A * | 1/1990 |
| JP | A-03-182916 | 8/1991 |
| JP | 11078817 A * | 3/1999 |
| JP | A-2007-122610 | 5/2007 |

OTHER PUBLICATIONS

Japanese Office Action dated Jan. 10, 2012 issued in Japanese Patent Application No. 2009-243847 (with translation).
Extended European Search Report issued in European Patent Application No. 10188361.9 dated Jun. 6, 2011.

* cited by examiner

*Primary Examiner* — Vicky Johnson
(74) *Attorney, Agent, or Firm* — Oliff & Berridge, PLC

(57) ABSTRACT

A vehicle operation pedal includes: a pedal arm disposed on a pedal support so as to be pivotable about a support axis, the pedal support being fixed to a vehicle; and a pedal sheet to be depressed by a driver, the pedal sheet being integrally fixed to a lower end portion of the pedal arm so as to extend from the pedal arm on both sides in a vehicle width direction, a pair of sheet attachment portions being integrally provided at the lower end portion of the pedal arm by bending the pedal arm so as to be enlarged apart from each other on both sides in the vehicle width direction, the pair of sheet attachment portions extending along the pedal sheet, and the pedal sheet being integrally fixed to the sheet attachment portions at two positions that are laterally spaced apart from each other in such a manner that a center of the pedal in the vehicle width direction sheet is located between the two positions.

4 Claims, 4 Drawing Sheets

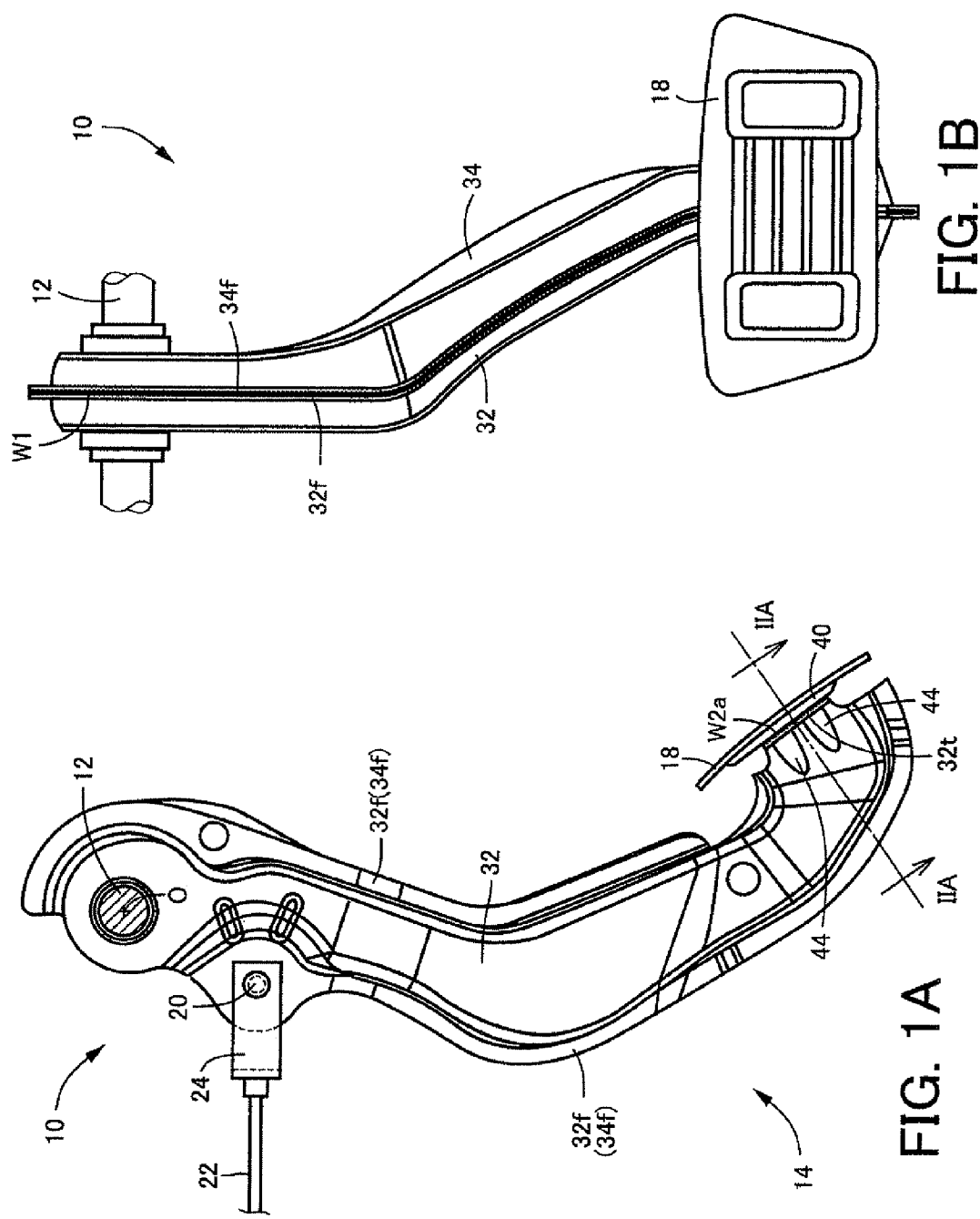

VEHICLE OPERATION PEDAL

INCORPORATION BY REFERENCE

The disclosure of Japanese Patent Application No. 2009-243847 filed on Oct. 22, 2009 including the specification, drawings and abstract is incorporated herein by reference in its entirety.

BACKGROUND OF THE INVENTION

1. Field of the Invention

The invention relates to a vehicle operation pedal and in particular to a structure for integrally fixing a pedal sheet to a lower end portion of a pedal arm.

2. Description of the Related Art

A vehicle operation pedal that includes (a) a pedal arm disposed on a pedal support so that the pedal arm is pivotable about a support axis, the pedal support being fixed to a vehicle and (b) a pedal sheet to be depressed by a driver, the pedal sheet being integrally attached to a lower end portion of the pedal arm so as to extend from the pedal arm on both sides in a vehicle width direction, is often used as a brake pedal, an accelerator pedal, or the like. The vehicle operation pedal described in Japanese Patent Application Publication No. 2007-122610 is an example. This pedal arm is formed of a pair of halves having shapes obtained by dividing the pedal arm in the vehicle width direction and the peripheral portions of the pair of halves are integrally welded to obtain a hollow structure. Lower end portions of the pair of halves, to which the pedal sheet is fixed, are enlarged apart from each other in the vehicle width direction and the pair of halves are bent inward from the enlarged end portions at substantially right angle to form a sheet attachment portion. The pedal sheet is integrally fixed to the sheet attachment portions by welding, for example.

However, in such a vehicle operation pedal, the welds are close to a center portion of the pedal sheet and therefore, during an offset depression, in which one end portion of the pedal sheet is depressed, a large pulling-off force is applied to the welds. For example, FIG. 6B is a sectional view corresponding to the VIB-VIB section of FIG. 6A and shows a case where sheet attachment portions 60a and 60b are inwardly provided at lower end portions of the pair of halves 32 and 34 of the operation pedal 14 and end edges of the sheet attachment portions 60a and 60b are integrally welded to the pedal sheet 18 by arc welding or the like. When a depression force F is applied to one end E of the pedal sheet 18, relatively large pulling-off forces La and Lb are applied to the welds W2a and W2b with the point P serving as a fulcrum. Thus, a relatively high joint strength is required and costs for welding become high.

SUMMARY OF THE INVENTION

The invention has been made in consideration of the above circumstances and an object of the invention is to relatively reduce the pulling-off force exerted at the time of an offset depression and make it possible to fix a pedal sheet to a pedal arm with a relatively low joint strength easily and at low costs.

To achieve the object, the first aspect of the invention in a vehicle operation pedal comprises (a) a pedal arm disposed on a pedal support so as to be pivotable about a support axis, the pedal support being fixed to a vehicle; and (b) a pedal sheet to be depressed by a driver, the pedal sheet being integrally fixed to a lower end portion of the pedal arm so as to extend from the pedal arm on both sides in a vehicle width direction, (c) a pair of sheet attachment portions being integrally provided at the lower end portion of the pedal arm by bending the pedal arm so as to be enlarged apart from each other on both sides in the vehicle width direction, the pair of sheet attachment portions extending along the pedal sheet, and (d) the pedal sheet being integrally fixed to the sheet attachment portions at two positions that are laterally spaced apart from each other in such a manner that a center of the pedal sheet in the vehicle width direction is located between the two portions.

According to the second aspect of the invention a vehicle operation pedal recited in the first aspect of the invention, comprises (a) the pedal arm is formed of a pair of halves having shapes obtained by being dividing in the vehicle width direction and has a hollow structure obtained by integrally joining the pair of halves at peripheral portions thereof, and (b) lower end portions of the pair of halves, to which the pedal sheet is fixed, are tapered so as to be enlarged in the vehicle width direction toward the pedal sheet and are bent further outward than enlarged end portions of the pair of halves so as to extend along a pedal sheet to provide the sheet attachment portions.

According to the third aspect of the invention, a vehicle operation pedal recited in the first or second aspect of the invention, comprises at least a part of a corner portion, at which the pedal arm is bent to provide the sheet attachment portions, bulges outward in the vehicle width direction.

According to the fourth aspect of the invention, a vehicle operation pedal recited in any of the first to third aspects of the invention, comprises each of a pair of the sheet attachment portions extends to vicinities of each of end portions of the pedal sheet in the vehicle width direction respectively.

According to the fifth aspect of the invention, a vehicle operation pedal recited in any of the first to fifth aspects of the invention, comprises the pedal arm and the pedal sheet are integrally welded at tip edges of the pair of sheet attachment portions.

In such a vehicle operation pedal, the pair of sheet attachment portions that are bent in the directions apart from each other on both sides in the vehicle width direction are integrally provided at the lower end portion of the pedal arm. The pedal sheet is integrally fixed to these sheet attachment portions at two positions that are spaced apart in the lateral direction with respect to the center in the vehicle width direction. Thus, even during an offset depression, in which one end portion of the pedal sheet is depressed, the pulling-off force that is applied to welded or the like fixing portions is relatively small and the pedal sheet may be fixed to the pedal arm with a relatively low joint strength easily and at low costs. For example, FIG. 3 corresponds to FIG. 6B, and when sheet attachment portions 32t, 34t are bent outward, are integrally welded to the pedal sheet 18 by arc welding at a tip edge. Even when a depression force F is applied to one end E of the pedal sheet 18, the pulling-off force La that is applied to the weld W2a on the side opposite to the one end E with respect to the point P, which serves as the fulcrum, is sufficiently small as compared to the case shown in FIG. 6B. The weld W2b on the one end E side is at substantially the same position as that of the fulcrum P and therefore, the pulling-off force applied to the weld W2b is substantially zero.

The second aspect of the invention shows a case where the pedal arm has a hollow structure formed of the pair of halves and in this case, it is possible to reduce weight while securing a certain strength (torsional rigidity etc.). At the same time, the lower-end portions of the pair of halves have a tapered portions so that the lower-end portions are enlarged in the vehicle width direction toward the pedal sheet and the pair of halves are bent further outward than the enlarged end portion along the pedal sheet to provide the sheet attachment portions. Thus, the strength (torsional rigidity etc.) of the lower end portion of the pedal arm is further increased and the posture of the pedal sheet fixed to the sheet attachment portions is further stabilized. At the same time, the pulling-off force applied to the fixing portions at the time of the offset depression is further reduced.

The third aspect of the invention, at least one of the corner portions are bent to provide the sheet attachment portions is bulged outward in the vehicle width direction so that the strength of the sheet attachment portions including the corner portions is increased and in addition to this, the pulling-off force applied to the fixing portions at the time of the offset depression is reduced, which leads to further stabilization of the posture of the pedal sheet. In addition, the weight is able to be further reduced by, for example, reducing the thickness of the pedal arm while securing a certain strength.

The fourth aspect of the invention shows a case where the pair of the sheet attachment portions extend to the vicinities of two end portions of the pedal sheet in the vehicle width direction. The posture of the pedal sheet fixed to the sheet attachment portions is further stabilized and the pulling-off force applied to the fixing portions at the time of the offset depression is further reduced.

The fifth aspect of the invention shows a case where the pedal arm and the pedal sheet are integrally welded at the tip edges, that is, the positions the most distant from each other, of the pair of sheet attachment portions. Thus, the posture of the pedal sheet is further stabilized and the pulling-off force applied to the welds (the fixing portion) at the time of the offset depression is further reduced.

BRIEF DESCRIPTION OF THE DRAWINGS

FIGS. 1A and 1B are diagrams showing a vehicle brake pedal, which is a first embodiment of the invention, where FIG. 1A shows a left side view and FIG. 1B shows a front view;

FIG. 2A is an enlarged view of the IIA-IIA section in FIG. 1A and FIG. 2B is a perspective view when viewed from the back of the pedal sheet;

FIG. 4A is a left side view and FIG. 4B is a perspective view when viewed from the back of a pedal sheet;

FIG. 6 is a diagram for explaining a comparative embodiment in relation to the invention, where

DETAILED DESCRIPTION OF EMBODIMENTS

Figure 2A:
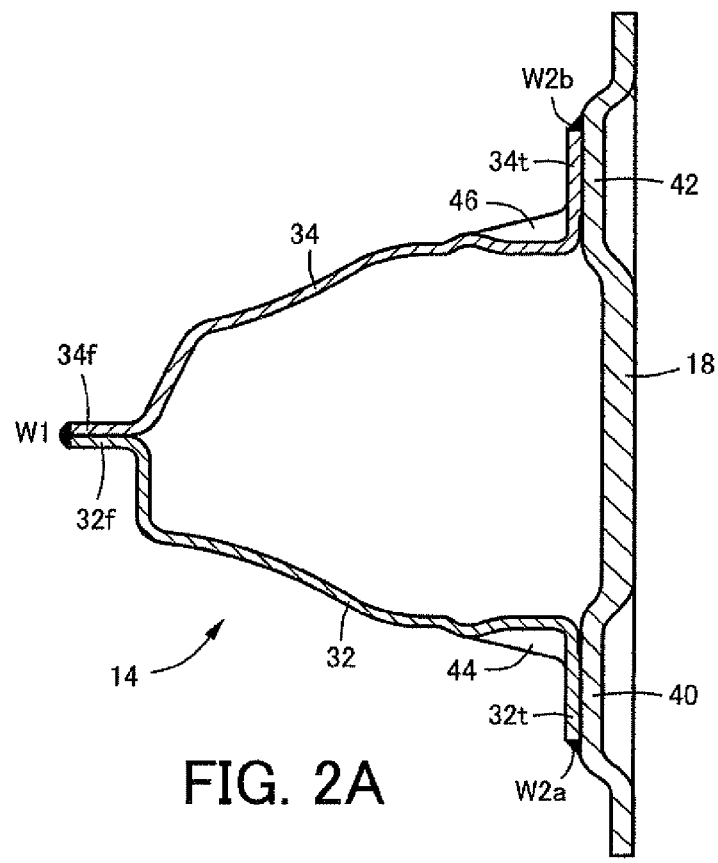
FIGS. 2A and 2B are diagrams showing a portion, at which a pedal sheet is attached to a pedal arm of the first embodiment in FIGS. 1A and 1B, where

The invention is suitably applied to a service brake pedal, a parking brake pedal, an accelerator pedal, or the like, for example. A pedal arm of a second invention has a hollow structure formed of a pair of halves. However, various forms may be adopted, such as a hollow pedal arm formed by bending a plate in a rectangular tube shape and integrally joining by welding, for example, or a plate pedal arm made with a relatively thick plate, for example.

The pair of halves each have a hat-shaped cross section, for example, and are put together in a position such that the pair of halves face each other so that flanges at their peripheries contact each other and are then integrally joined by welding, for example, into a hollow structure. The hollow structure is not necessarily closed all around the circumference like a bag, but may be partially open.

It is preferable that a pair of sheet attachment portions provided at a lower end portion of the pedal arm be formed substantially symmetrically with respect to the center line of a pedal sheet in a vehicle width direction and fixed at positions symmetrically located with respect to the center line. However, the pair of sheet attachment portions may be asymmetrically formed or may be fixed at positions asymmetrically located with respect to the center line of the pedal sheet in the vehicle width direction.

In the case of the pedal arm having a hollow structure, the pair of sheet attachment portions may be formed by cutting and bending side plate portions, for example. In the case of the plate pedal arm made with a flat plate, the pair of sheet attachment portions may be formed by forking the plate to have two or more than three branches and bending these branches at substantially right angle in the opposite directions. It is preferable that the sheet attachment portions be formed in a flat shape, a curved shape, or the like, in conformity with the shape of the pedal sheet so that the sheet attachment portions substantially closely fit the back surface of the pedal sheet, for example. However, it suffices that at least part of the sheet attachment portions contact with the pedal sheet and the pedal sheet can be integrally fixed to the sheet attachment portions by welding or fixing means, such as adhesive agent, screws, or the like. The pedal arm and the pedal sheet are made of a metallic material, for example. However, when adhesive agent, screws, or the like, is used as the fixing means, a synthetic resin material or the like may be used as the material for these pedals.

The pedal sheet and the sheet attachment portions are welded together by, for example, consumable electrode-arc welding, fillet welding using a welding rod, or the like, along the tip edge and the side edges of each of the pair of sheet attachment portions, for example. However, a welding method may be used, in which welding is performed, without using filler metal, by melting the parent materials (the pedal sheet and the sheet attachment portions), such as plasma arc welding or tungsten inert gas (TIG) welding, which are non-consumable electrode welding, or laser welding, or electron beam welding. Other welding methods may be used, that is, a central portion, for example, of each of the sheet attachment portions may be welded to the pedal sheet by resistance welding, such as spot welding.

In the second aspect of the invention, lower end portions of the pair of halves have tapered portions enlarging in the vehicle width direction toward lower ends of the pair of halves. However, in the embodiments of the other inventions, the pair of halves may reach the lower end portion with the pair of halves being parallel to each other. Various forms of the tapered portion may be adopted, such as a tapered portion that enlarges in a V shape until reaching the sheet attachment portions or a tapered portion that enlarges in a U shape such that tip portions of the tapered portion come into contact with the pedal sheet substantially perpendicularly. In summary, it suffices that the tip portions, at which the sheet attachment portions are provided, are more apart from each other in the vehicle width direction than at the other portions of the pedal arm.

In a third aspect of the invention, at least a part of a corner portion bulges outward. However, the sheet attachment portions may be provided by bending the pedal arm along a substantially straight line in the embodiments of the other inventions. The bulge in the third aspect of the invention may be formed by making the entire portion of the corner portion convex outward in a curved shape. However, the bulge may be a reinforcement bead formed by making a part of or plural portions of the corner portion convex outward partially. The reinforcement bead is provided in an elongated shape extending from the corner portion in the direction of the pedal arm (direction away from the pedal sheet). Various forms may be adopted, such as a semi-cylindrical shape, a semi-coned shape, or a shape with a V-shaped cross section. It is also possible to provide a plurality of reinforcement beads at each of both corner portions.

In a fourth aspect of the invention, the pair of sheet attachment portions extend to the vicinities of two end portions of the pedal sheet in the vehicle width direction. The vicinity of the end portion means that the position substantially coincides with the end portion of the pedal sheet or is short of the end portion of the pedal sheet by a range of less than 5 mm. In the embodiments of the other inventions, the tip of the sheet attachment portion may be short of the end portion of the pedal sheet by 5 mm or more.

(First Embodiment)

Figure 2B:
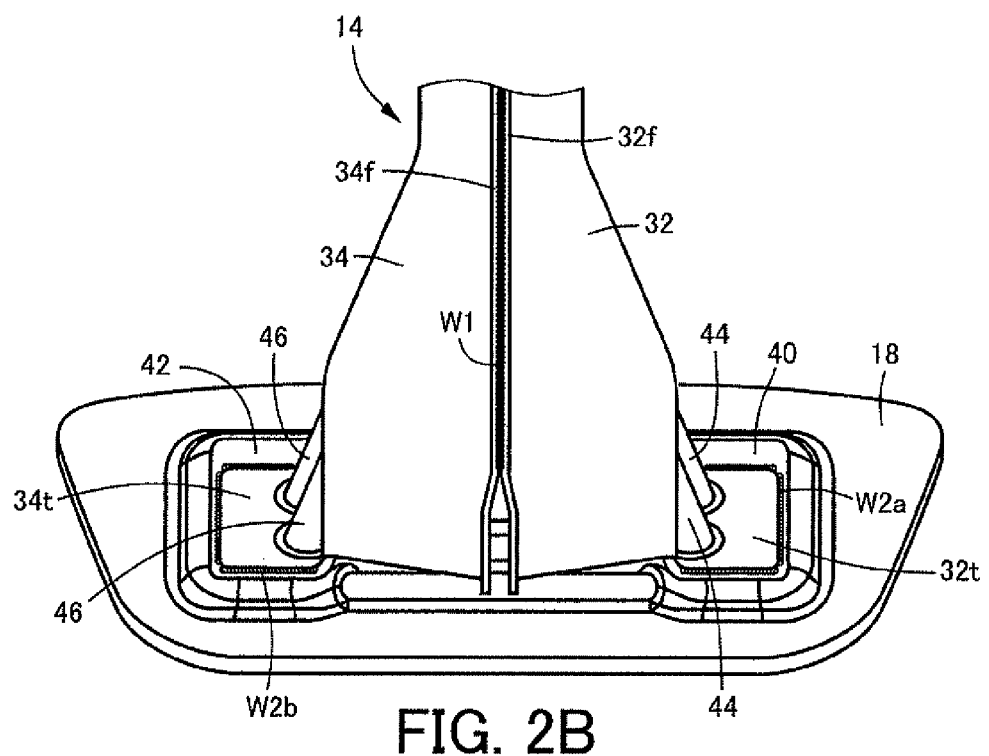

A first embodiment of the invention will be described in detail below with reference to drawings. FIGS. 1A and 1B are diagrams showing the brake pedal 10 for a service brake of the vehicle, to which the invention is applied. FIG. 1A shows a left side view and FIG. 1B shows a front view. FIGS. 2A and 2B are diagrams for explaining the joint structure of the pedal arm 14 and the pedal sheet 18 of the brake pedal 10 shown in FIGS. 1A and 1B. FIG. 2A is an enlarged view of the IIA-IIA section in FIG. 1A. FIG. 2B is a perspective view when viewed from the back of the pedal sheet 18 (that is, from below the vehicle). The brake pedal 10 has the pedal arm 14 as the main component and is supported at an upper end portion of the pedal arm 14 so as to be pivotable about a support axis O, which is an axis of a support shaft 12.

A plate-like pedal sheet 18 is integrally fixed to a lower end of the pedal arm 14. When the pedal sheet 18 is depressed by a driver, the brake pedal 10 is pivoted clockwise about the support shaft 12 in FIG. 1A. A push rod 22 of a brake master cylinder is connected to the brake pedal 10 via a clevis 24 so as to be pivotable, relative to the brake pedal 10, about the axis of a connecting pin 20 that is substantially parallel with the support shaft 12. When the push rod 22 is mechanically pushed leftward in the drawing as the brake pedal 10 pivots, the brake hydraulic pressure is produced according to the depression force exerted on the brake pedal 10. The push rod 22 is urged to extrude from the brake master cylinder. When the depression of the pedal sheet 18 is ceased, the brake pedal 10 is pivoted counterclockwise about the support shaft 12 by the urging force and held at the home position shown in FIGS. 1A and 1B.

The pedal arm 14 has a hollow structure made with thin plates and is formed of a pair of halves 32 and 34 having shapes obtained by dividing the pedal arm 14 into two parts in the vehicle width direction, that is, in the right-left direction in FIG. 1B. Each of the halves 32 and 34 is obtained by bending a steel plate with the use of a press and has a substantially hat-shaped cross section. In a state where the halves 32 and 34 are put together in a position such that the pair of halves face each other on the opening side of the hat shape so that plate-like peripheral flanges 32f and 34f, which are provided to extend outward at the openings and are parallel with each other, are in close contact with each other, the halves 32 and 34 are integrally welded by arc welding or the like at the peripheral edges of the peripheral flanges 32f and 34f, that is, the peripheral edges that extend in the longitudinal direction and the vertical direction of the vehicle. A first weld W1 shown in FIGS. 1B, 2A, and 2B shows a weld, at which the peripheral flanges 32f and 34f are welded to each other.

The pedal sheet 18 is made with a metallic plate, such as a steel plate, and is partially brought into contact with the pedal arm 14 and is integrally welded thereto by arc welding or the like. Specifically, lower-end rear portions (driver's seat side) of the halves 32 and 34, which are components of the pedal arm 14, are enlarged in the vehicle width direction toward the pedal sheet 18 in a tapered shape (substantially U shape in the first embodiment) as can be clearly seen from FIGS. 2A and 2B and are bent at substantially right angle further outward than the enlarged end portions (rear ends), that is, on both sides in the vehicle width direction to provide a pair of flat, sheet attachment portions 32t and 34t that extend along the pedal sheet 18. The pedal sheet 18 is integrally joined to these sheet attachment portions 32t and 34t by welding so as to substantially closely fit the sheet attachment portions 32t and 34t. The pair of sheet attachment portions 32t and 34t each have a substantially rectangular shape and the sheet attachment portions 32t and 34t and the pedal sheet 18 are integrally welded at three outer peripheral edges of the rectangular shape, the three outer peripheral edges including a tip edge and forming a C shape. Second welds W2a and W2b shown in FIGS. 1A, 2A, and 2B show the welds of the sheet attachment portions 32t and 34t and the pedal sheet 18. In addition to or instead of welding the outer peripheral edges, a central portion, for example, of each of the sheet attachment portions 32t and 34t may be welded to the pedal sheet 18 by resistance welding, such as spot welding.

The pedal sheet 18 is formed to be symmetric with respect to the center line in the vehicle width direction and is slightly curved in the vertical direction as is apparent from FIG. 1A, while flat base portions 40 and 42 that project to the back side (pedal arm 14 side) are provided at right and left, two positions that are symmetrically located with respect to the center line. The pair of sheet attachment portions 32t and 34t are integrally fixed to the flat base portions 40 and 42 in a close contact state. The pedal sheet 18 is provided with, in addition to the base portions 40 and 42, reinforcing projections and depressions formed by press working or the like. Meanwhile, at the corner portions of the pair of halves 32 and 34, at which the pair of halves 32 and 34 are bent outward at substantially right angle to provide the sheet attachment portions 32t and 34t, reinforcing beads 44 and 46 bulging outward are provided so as to extend in the direction substantially perpendicular to the sheet attachment portions 32t and 34t (lower left direction in FIG. 1A). These reinforcing beads 44 and 46 have a substantially semi-conical shape and each include two beads, which are spaced apart from each other in the vertical direction and are parallel to each other.

In the brake pedal 10 of the first embodiment, the pair of sheet attachment portions 32t and 34t that are bent at substantially right angle in the directions apart from each other on both sides in the vehicle width direction are integrally provided at the lower end portion of the pedal arm 14. The pedal sheet 18 is integrally fixed to the sheet attachment portions 32t and 34t by welding at two positions (base portions 40 and 42) that are symmetrically spaced apart in the lateral direction with respect to the center in the vehicle width direction. Thus, even during an offset depression, in which one end portion of the pedal sheet 18 is depressed, the pulling-off force that is applied to welded fixing portions (second welds W2a and W2b) is relatively small and the pedal sheet 18 may be welded to the pedal arm 14 with a relatively low joint strength easily and at low costs.

Figure 3:
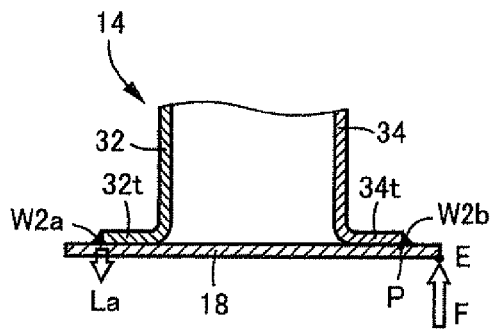
FIG. 3 is a schematic view for explaining a pulling-off force applied to welds W2$a$ and W2$b$ when a depression force F is applied to one end E of the pedal sheet in the first embodiment in FIGS. 1A and 1B, corresponding to FIG. 6B.
Figure 6A:
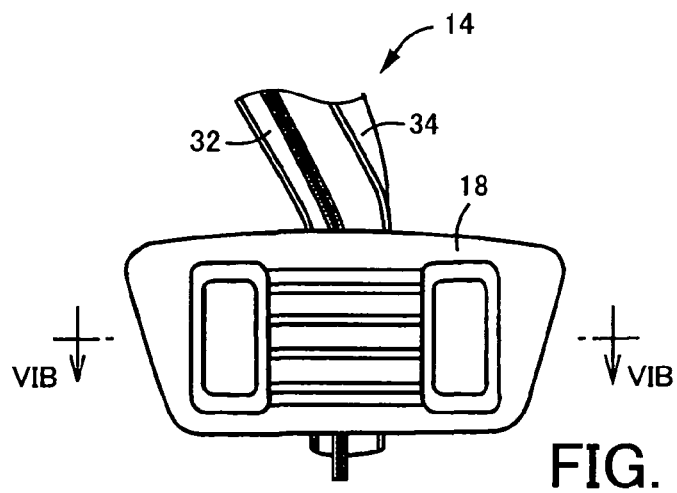
FIG. 6A is a front view and FIG. 6B is a schematic view for explaining pulling-off forces La and Lb applied to welds W2$a$ and W2$b$ when a depression force F is applied to one end E of a pedal sheet, corresponding to the VIB-VIB section of FIG. 6A.
Figure 6B:
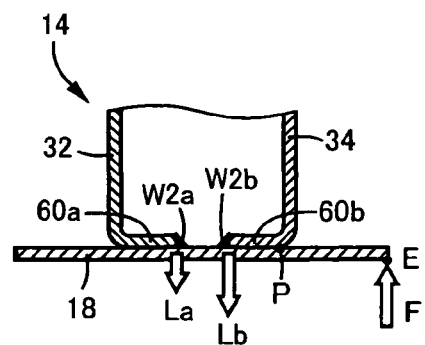

FIG. 3 is a schematic view of a fixing portion of the pedal sheet 18 of the first embodiment and corresponds to FIG. 6B. Even when a depression force F is applied to one end E of the pedal sheet 18, the pulling-off force La that is applied to the second weld W2a on the side opposite to the one end E with respect to the point P, which serves as the fulcrum, is sufficiently small as compared to the case shown in FIG. 6B. The second weld W2b on the one end E side is at substantially the same position as that of the fulcrum P and therefore, the pulling-off force applied to the second weld W2b is substantially zero.

The first embodiment shows a case where the pedal arm 14 has a hollow structure formed of the pair of halves 32 and 34 and in this case, it is possible to reduce weight while securing a certain strength (torsional rigidity etc.). At the same time, the lower-end rear portion side of the pair of halves 32 and 34 is enlarged in the vehicle width direction in a tapered shape and the pair of halves 32 and 34 are bent further outward than the enlarged end portion along the pedal sheet 18 to provide the sheet attachment portions 32t and 34t. Thus, the strength (torsional rigidity etc.) of the lower end portion of the pedal arm 14 is further increased and the posture of the pedal sheet 18 fixed to the sheet attachment portions 32t and 34t is further stabilized. At the same time, the fixing portions (second welds W2a and W2b) are close to the end portions of the pedal sheet 18, so that the pulling-off force applied to the fixing portions (second welds W2a and W2b) at the time of the offset depression is further reduced.

In addition, in the first embodiment, at the corner portions, at which the pair of halves 32 and 34 are bent outward at substantially right angle to provide the sheet attachment portions 32t and 34t, reinforcing beads 44 and 46 bulging outward are provided so as to extend in the direction substantially perpendicular to the sheet attachment portions 32t and 34t, so that the strength of the sheet attachment portions 32t and 34t including the corner portions is increased and in addition to this, the pulling-off force applied to the fixing portions (second welds W2a and W2b) at the time of the offset depression is reduced, which leads to further stabilization of the posture of the pedal sheet 18. In addition, the weight is further reduced by, for example, reducing the thickness of the pair of halves 32 and 34 while securing a certain strength.

In addition, in the first embodiment, the pedal arm 14 and the pedal sheet 18 are integrally welded at the C-shaped outer peripheral edges, including the tip edges, that is, the positions the most distant from each other, of the pair of sheet attachment portions 32t and 34t. Thus, the posture of the pedal sheet 18 is further stabilized and the pulling-off force applied to the fixing portions (second welds W2a and W2b) at the time of the offset depression is further reduced.

In addition, in the first embodiment, the pair of flat base portions 40 and 42 are provided on the pedal sheet 18 and the pair of sheet attachment portions 32t and 34t are fixed to the base portions 40 and 42, so that it is possible to make the shape of the whole of the pedal sheet 18 a predetermined shape (curved shape in the case of the first embodiment) to secure depression operability and at the same time, it is possible to reliably bring the sheet attachment portions 32t and 34t into close contact with the base portions 40 and 42 to obtain a prescribed fixing strength. Thus, manufacturing costs are further reduced as compared to the case where the sheet attachment portions 32t and 34t are formed in a curved shape, for example, in conformity with the shape of the pedal sheet 18.

(Second Embodiment)

Next, a second embodiment of the invention will be described. Note that in the following description of the second embodiment, portions substantially the same as those of the first embodiment are designated by the same reference numerals and detailed description thereof is omitted.

Figure 4A:
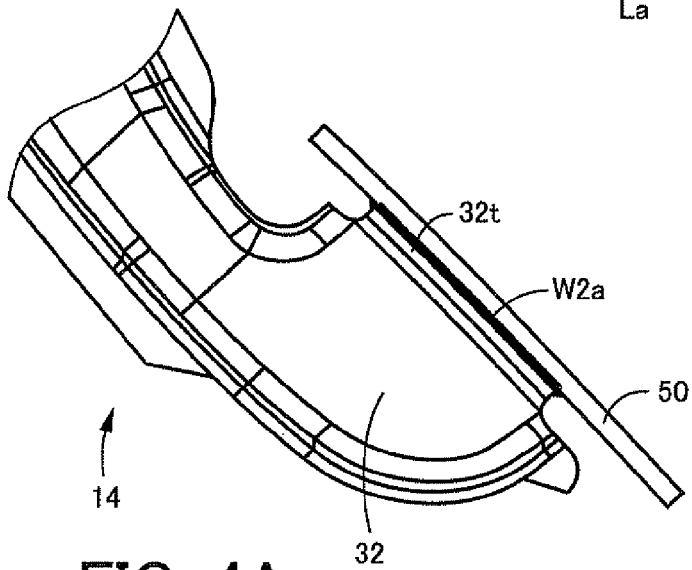
FIGS. 4A and 4B are diagrams for explaining a second embodiment of the invention, where
Figure 4B:
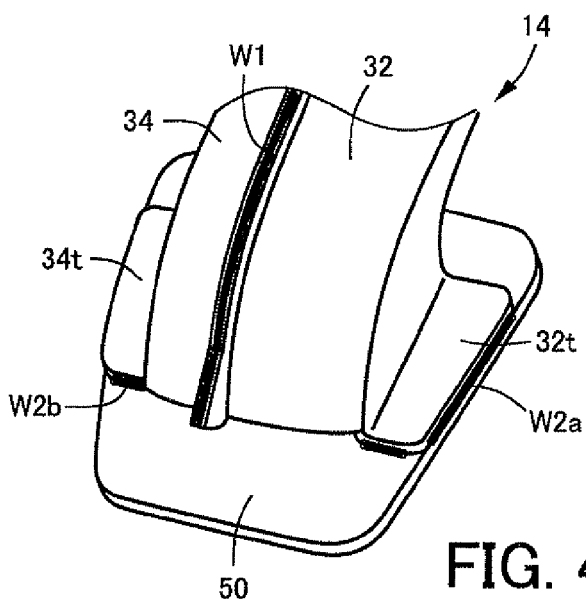

The second embodiment shown in FIG. 4 shows a case where the dimension of a pedal sheet 50 in the vehicle width direction is relatively narrow and the tips of the sheet attachment portions 32t and 34t provided at the lower-end rear portions of the pair of halves 32 and 34 respectively reach the end edges of the pedal sheet 50 in the vehicle width direction. FIG. 4A is a left side view and FIG. 4B is a perspective view when viewed from the back of the pedal sheet 50. The sheet attachment portions 32t and 34t and the pedal sheet 50 are integrally welded at three outer peripheral edges of each of the sheet attachment portions 32t and 34t, the three outer peripheral edges including a tip edge and forming a C shape. In the second embodiment, the tips of the sheet attachment portions 32t and 34t reach the end edges of the pedal sheet 50 in the vehicle width direction, so that the posture of the pedal sheet 50 fixed to the sheet attachment portions 32t and 34t is further stabilized and the pulling-off force applied to the fixing portions (second welds W2a and W2b) at the time of the offset depression is further reduced to substantially zero.

(Third Embodiment)

Figure 5:
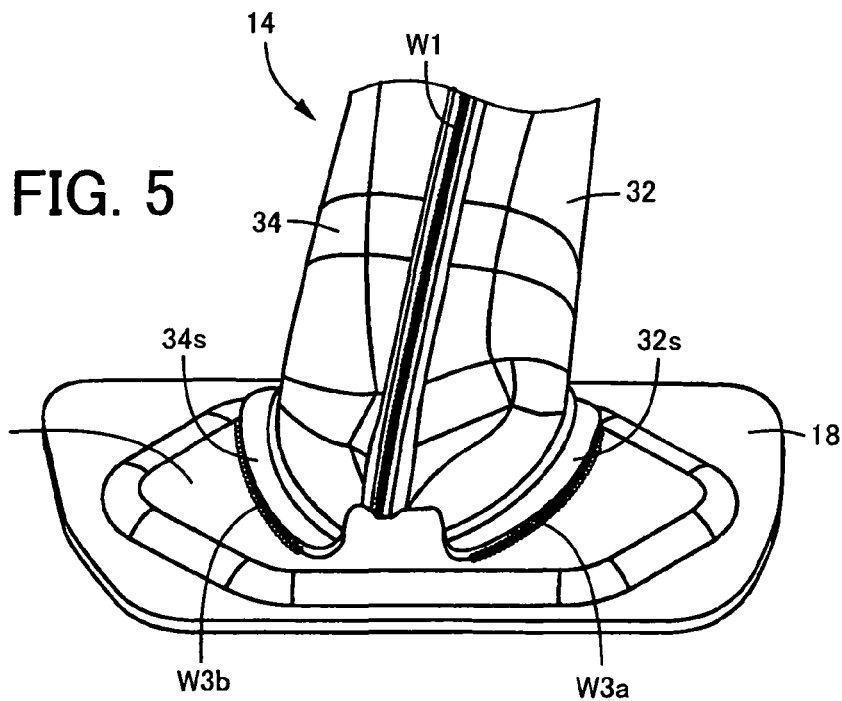
FIG. 5 is a diagram for explaining a third embodiment of the invention and is a perspective view when viewed from the back of a pedal sheet.

FIG. 5 is a perspective view when viewed from the back of the pedal sheet 18 (that is, from below the vehicle), same as shown in FIG. 2B. A third embodiment is the same as the first embodiment in that the lower end portion of the pedal arm 14 is enlarged in a tapered shape. However, sheet attachment portions 32s and 34s provided by bending the pedal arm 14 further outward than the enlarged end portion along the pedal sheet 18 are, along with the corner portions at which the pedal arm 14 is bent, curved to gently bulge outward in the vehicle width direction to form a shape of the Chinese character for "eight". The sheet attachment portions 32s and 34s are brought into close contact with a flat, single base portion 52 provided, at the center portion of the pedal sheet 18, so as to bulge out on the back side, and the outer peripheral edge portions with a curved shape are integrally welded by arc welding or the like. Third welds W3a and W3b represent the welds at which the sheet attachment portions 32s and 34s and the pedal sheet 18 are welded. Also in the third embodiment, the corner portions of the pair of sheet attachment portions 32s and 34s each bulge outward, so that the strength of the sheet attachment portions 32s and 34s including the corner portions is increased and therefore, the operations and effects similar to those achieved by the first embodiment are achieved.

While embodiments of the invention have been described in detail above with reference to drawings, these are merely example embodiments and the invention can be implemented in other forms variously modified and/or improved based on the knowledge of persons skilled in the art.

What is claimed is:

1. A vehicle operation pedal comprising:
 a pedal arm disposed on a pedal support so as to be pivotable about a support axis, the pedal support being fixed to a vehicle; and a pedal sheet to be depressed by a driver, the pedal sheet integrally fixed to a lower end portion of the pedal arm and extending from the pedal arm on both sides in a vehicle width direction, a pair of sheet attachment portions integrally provided at the lower end portion of the pedal arm by bending the pedal arm so as to extend apart from each other on both sides in the vehicle width direction, the pair of sheet attachment portions extending along the pedal sheet, the pedal sheet integrally fixed to the sheet attachment portions at two positions that are laterally spaced apart from each other in such a manner that a center of the pedal sheet in the vehicle width direction is located between the two positions, and a corner portion, at which the pedal arm is bent to provide the sheet attachment portions, and an outer peripheral edge portion of the sheet attachment portions, both curving to be bulged outward in the vehicle width direction.

2. The vehicle operation pedal according to claim 1, wherein the pedal arm is formed of a pair of halves having shapes obtained by being divided in the vehicle width direction and has a hollow structure obtained by integrally joining the pair of halves at peripheral portions thereof, and lower end portions of the pair of halves, to which the pedal sheet is fixed, are tapered so as to be enlarged in the vehicle width direction toward the pedal sheet and are bent further outward than enlarged end portions of the pair of halves so as to extend along the pedal sheet to provide the sheet attachment portions.

3. The vehicle operation pedal according to claim 1, wherein each of a pair of the sheet attachment portions extends towards each of the end portions of the pedal sheet in the vehicle width direction respectively.

4. The vehicle operation pedal according to claim 1, wherein the pedal arm and the pedal sheet are integrally welded at tip edges of the pair of sheet attachment portions.

* * * * *